Sept. 27, 1927.  H. PARRIS  1,643,315
TRAP
Filed Jan. 12, 1927
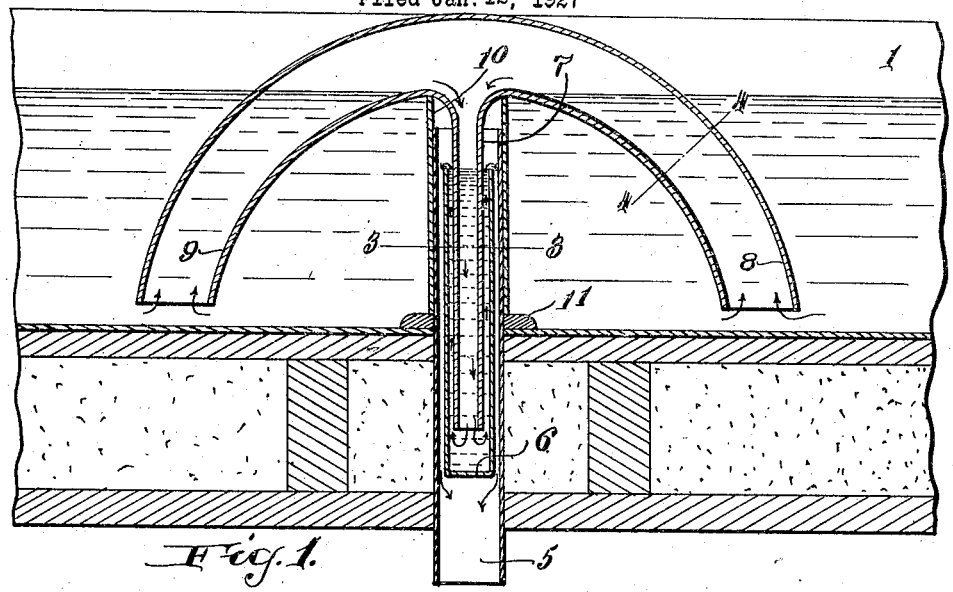
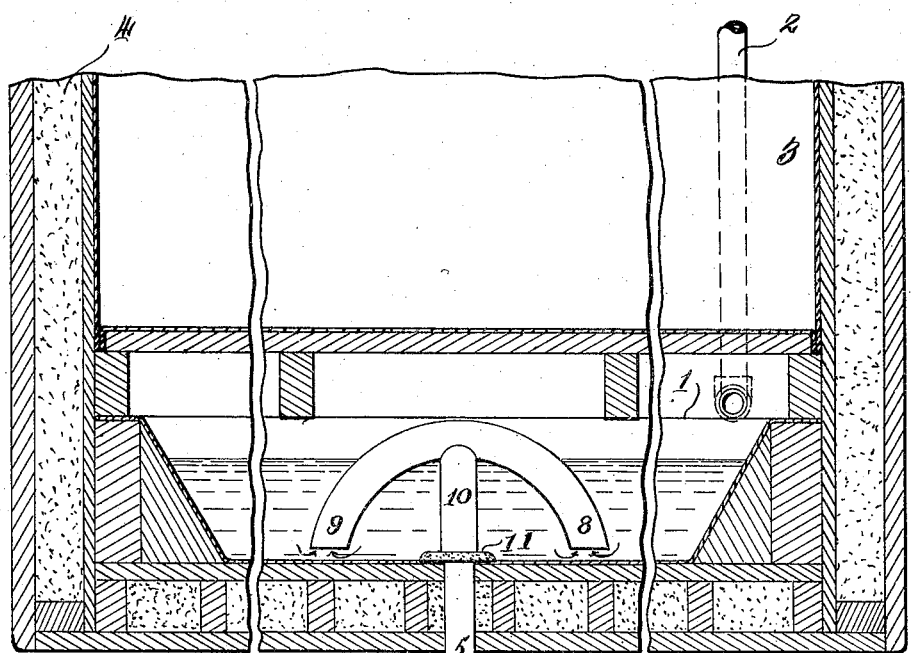
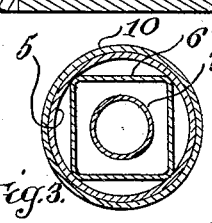
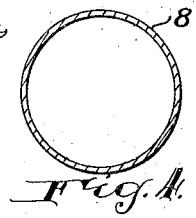
INVENTOR.
Harry Parris
BY Thomas W. Y. Clark
ATTORNEY.

Patented Sept. 27, 1927.

1,643,315

UNITED STATES PATENT OFFICE.

HARRY PARRIS, OF BALTIMORE, MARYLAND.

TRAP.

Application filed January 12, 1927. Serial No. 160,574.

My invention relates to a new improved trap for refrigerators or the like in which the liquid is allowed to pass through the trap but the passage of air in either direction is effectively blocked, for a refrigerator is effective only when cold air is kept in and when air or gases are kept out, and the objects of my invention are to make a trap that will serve these purposes more effectively and one which will begin to operate when the liquid reaches the desired level in its container, and one which will not draw out too much liquid, also my trap can be easily cleaned out and it will not easily get out of order. With these and other objects in view, the invention consists in certain novel parts and arrangements of parts as will more fully appear as the description proceeds, the novel features thereof being pointed out in the appended claims.

For a full understanding of the invention, reference is to be had to the following description and the accompanying drawings, in which:

Figure 1 is a vertical sectional view of the trap in the liquid receptacle in the bottom of a refrigerator.

Figure 2 is a vertical sectional view of the lower part of a refrigerator showing the trap in operation.

Figure 3 is a cross-sectional view on line 3—3 of Figure 1.

Figure 4 is a cross-sectional view on line 4—4 of Figure 1.

Similar numerals refer to similar parts throughout the several views.

The refrigerator 4 has a liquid receptacle 1 which receives water from the ice compartment, not shown, through pipe 2. Pipe 2 is shown passing through food chamber 3 of the refrigerator.

Pipe 5 passes out of the bottom of the refrigerator and may be connected with a sewer or other drain means. This pipe passes upwardly through the bottom of the liquid receptacle, with a tight joint, with said bottom. Soldered at its upper corners into this pipe is a long square cup 6. At the desired level of the liquid pipes branch from a common center downwardly to near the bottom of the receptacle, as pipes 8 and 9. At the common center these pipes are connected to a pipe 7 passing down into said cup to near its bottom. Another pipe 10 is soldered to the outside of the center of pipes 8 and 9, enclosing the upper part of pipe 7, and slidably fitting over pipe 5. 11 is a rubber washer to positively seal the space between pipes 5 and 10, but this would not be necessary if a close sliding fit between the pipes were made.

In operation the liquid level in the receptacle rises until it reaches the overflow, or top of pipe 7, it then fills pipe 7 to the top of cup 6, passes between the sides of pipe 7 and cup 6, and cup 6 and pipe 5 and passes out pipe 5. The water immediately overflows when it reaches the proper height, and no sufficient air bubble exists at the top of the pipes 8 and 9 to prevent this overflow. Also, the two pipes 8 and 9 tend to aid each other and one counterbalances the other should air try to get in at either. The pipes 7, 8, 9 and 10 can be removed for cleaning them or the cup.

Many changes could be made to carry out the ideas of the invention without departing from its spirit, and I therefore intend to be limited only by the following claims.

I claim:

1. In a trap for a refrigerator or the like, a liquid receptacle, a pipe extending upwardly through the bottom of said receptacle, a cup in said pipe, a space between the walls of said cup and pipe for the passage of liquid therethrough, a pipe extending from near the bottom of said receptacle upwardly to near the desired surface of liquid in said receptacle and then down into said cup, said last named pipe and cup having a space between their respective walls for the passage of liquid therethrough, and means to support said last named pipe and to seal the space between it and said first named pipe whereby the level of liquid in said receptacle is maintained substantially at the point of overflow of said second named pipe.

2. In a trap for a refrigerator or the like, a liquid receptacle, a pipe extending upwardly through the bottom of said receptacle, a cup in said pipe, a space between the walls of said cup and pipe for the passage of liquid therethrough, a pipe extending from near the bottom of said receptacle to near the desired surface of liquid in said receptacle and then down into said cup, said last named pipe and cup having a space between their respective walls for the passage of liquid therethrough, and a pipe having a liquid tight connection with said first named pipe at one end, and with said second named pipe at the other end whereby the level of liquid in said receptacle is maintained substantially at the point of overflow of said second named pipe.

3. In a trap for a refrigerator or the like, a liquid receptacle, a pipe extending upwardly through the bottom of said receptacle, a cup in said pipe, a space between the walls of said cup and pipe for the passage of liquid therethrough, two opposite radially directed pipes extending from near the desired surface of liquid in said receptacle to near the bottom of said receptacle, said radially directed pipes, at their center of radiation, being connected together and to a pipe extending down into said cup, said last named pipe and cup having a space between their respective walls for the passage of liquid therethrough, and means to support said radially directed pipes and to seal the space between them and the pipe extending into said cup and said first named pipe whereby the level of liquid in said receptacle is maintained substantially at the point of overflow of said two opposite radially directed pipes.

4. In a trap for a refrigerator or the like, a liquid receptacle, a pipe extending upwardly through the bottom of said receptacle, a cup in said pipe, a space between the walls of said cup and pipe for the passage of liquid therethrough, a plurality of radially directed pipes extending from near the desired surface of liquid in said receptacle to near the bottom of said receptacle, said radially directed pipes, at their center of radiation, being connected together and to a pipe extending down below the lower ends of said radially directed pipes and into said cup, the pipe extending into the cup and the cup and pipe having a space between their respective walls for the passage of liquid therethrough, and means to support said radially directed pipes and to seal the space between them and the pipe extending into said cup and said first named pipe whereby the level of liquid in said receptacle is maintained substantially at the point of overflow of said plurality of radially directed pipes.

5. In a trap for a refrigerator or the like, a liquid receptacle, a pipe extending upwardly through the bottom of said receptacle, a cup in said pipe, a space between the walls of said cup and pipe for the passage of liquid therethrough, a plurality of radially directed pipes extending from near the desired surface of liquid in said receptacle to near the bottom of said receptacle, said radially directed pipes, at their center of radiation, being connected together and to a pipe extending down into said cup, said last named pipe and cup having a space between their respective walls for the passage of liquid therethrough, the top of said cup being above the lower ends of said radially directed pipes and means to support said last named pipes and to seal the space between them and the pipe extending into said cup and said first named pipe whereby the level of liquid in said receptacle is maintained substantially at the point of overflow of said plurality of radially directed pipes.

6. In a trap for a refrigerator or the like, a liquid receptacle, a pipe extending upwardly through the bottom of said receptacle, a cup in said pipe, a space between the walls of said cup and pipe for the passage of liquid therethrough, a plurality of radially directed pipes extending from near the desired surface of liquid in said receptacle to near the bottom of said receptacle, said radially directed pipes, at their center of radiation, being connected together and to a pipe extending down into said cup, said last named pipe and cup having a space between their respective walls for the passage of liquid therethrough, and a pipe having a liquid tight connection with said first named pipe at one end, and with said radially directed pipes and the pipe extending into said cup at the other end whereby the level of liquid in said receptacle is maintained substantially at the point of overflow of said plurality of radially directed pipes.

7. In a trap for a refrigerator or the like, a liquid receptacle, a pipe extending upwardly through the bottom of said receptacle, a cup in said pipe, a space between the walls of said cup and pipe for the passage of liquid therethrough, a plurality of radially directed pipes extending from near the desired surface of liquid in said receptacle to near the bottom of said receptacle, said radially directed pipes, at their center of radiation, being connected together and to a pipe extending down into said cup, said last named pipe and cup having a space between their respective walls for the passage of liquid therethrough, and means to support said radially directed pipes and to seal the space between them and the pipe extending into said cup and said first named pipe whereby the level of liquid in said receptacle is maintained substantially at the point of overflow of said plurality of radially directed pipes.

HARRY PARRIS.